(12) United States Patent
Schuetz

(10) Patent No.: US 8,477,471 B2
(45) Date of Patent: Jul. 2, 2013

(54) TAPPING ARMATURE FOR A TRANSPORT AND STORAGE CONTAINER FOR LIQUIDS

(75) Inventor: Udo Schuetz, Selters (DE)

(73) Assignee: Protechna S.A., Fribourg (CH)

( * ) Notice: Subject to any disclaimer, the term of this patent is extended or adjusted under 35 U.S.C. 154(b) by 475 days.

(21) Appl. No.: 12/752,852

(22) Filed: Apr. 1, 2010

(65) Prior Publication Data

US 2010/0252765 A1 Oct. 7, 2010

(30) Foreign Application Priority Data

Apr. 4, 2009 (DE) .................. 10 2009 016 451

(51) Int. Cl.
*H05F 3/00* (2006.01)

(52) U.S. Cl.
USPC ........................................... 361/215

(58) Field of Classification Search
USPC ........................................... 361/215
See application file for complete search history.

(56) References Cited

U.S. PATENT DOCUMENTS

| | | | |
|---|---|---|---|
| 6,156,969 A | 12/2000 | Schutz | |
| 7,042,695 B2 * | 5/2006 | Przytulla et al. | 361/215 |
| 7,762,528 B2 * | 7/2010 | Butruille | 251/305 |
| 2003/0111465 A1 | 6/2003 | Hamm | |
| 2009/0001078 A1 | 1/2009 | Cassina | |
| 2010/0044612 A1 | 2/2010 | Schuetz | |

FOREIGN PATENT DOCUMENTS

| | | |
|---|---|---|
| DE | 198 15 082 A1 | 10/1999 |
| DE | 102 16 960 B4 | 7/2005 |
| DE | 10 2006 041 724 A1 | 3/2008 |
| EP | 0 949 159 A2 | 10/1999 |
| EP | 1 319 608 A1 | 6/2003 |
| EP | 2 008 946 A1 | 12/2008 |
| EP | 2 157 028 A1 | 2/2010 |
| WO | 2008/028556 A1 | 3/2008 |

OTHER PUBLICATIONS

European Patent Office, Search Report, Application No. 10158482.9, Jan. 25, 2011.
European Search Report dated Jul. 12, 2010.

* cited by examiner

*Primary Examiner* — Stephen W Jackson
(74) *Attorney, Agent, or Firm* — Quarles & Brady LLP

(57) ABSTRACT

A tapping armature having an armature housing is made from plastic for liquid transport and storage containers, which are equipped with a plastic inner container having a filling port and a drain port for connection of the tapping armature, an outer casing made from metal mesh or sheet metal, and a pallet-like base made from metal. The tapping armature with the filling port of the armature housing is screwed to a connecting flange designed as a threaded flange and made from an electrically non-conductive plastic material, which is welded to the drain port of the inner container. The connecting flange of the armature housing is connected to the base of the outer casing of the transport and storage container via an grounding lead made from an electrically conductive plastic material. The connecting flange and the grounding lead are produced in two production steps with an injection molding machine according to 2K technology. In a further embodiment of the tapping armature, the connecting flange and the grounding cable are injection molded as a single part from an electrically conductive plastic, and the grounding cable is connected to the flange ring of the connecting flange by a tear-off film.

6 Claims, 5 Drawing Sheets

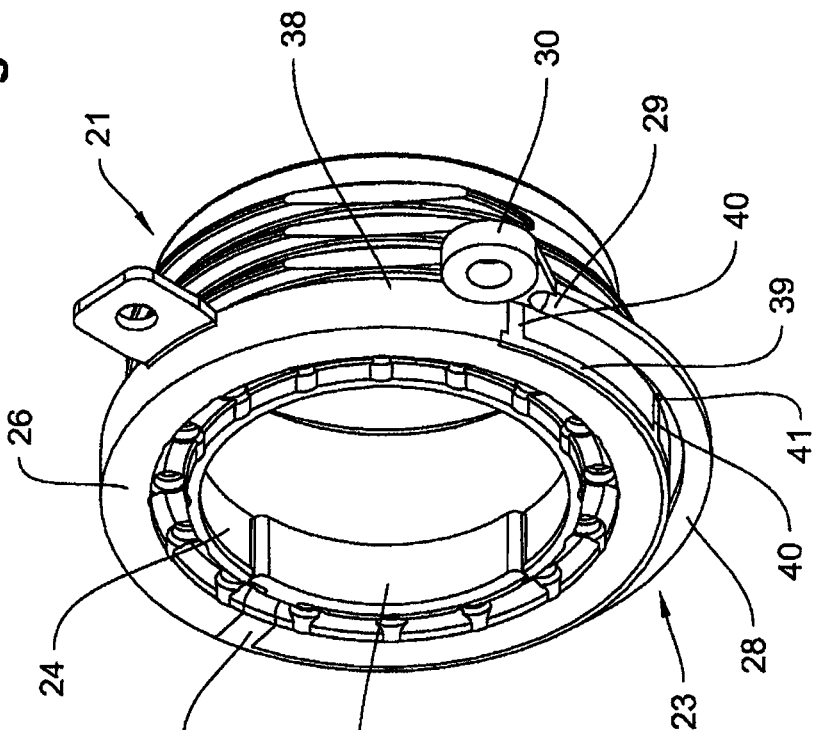
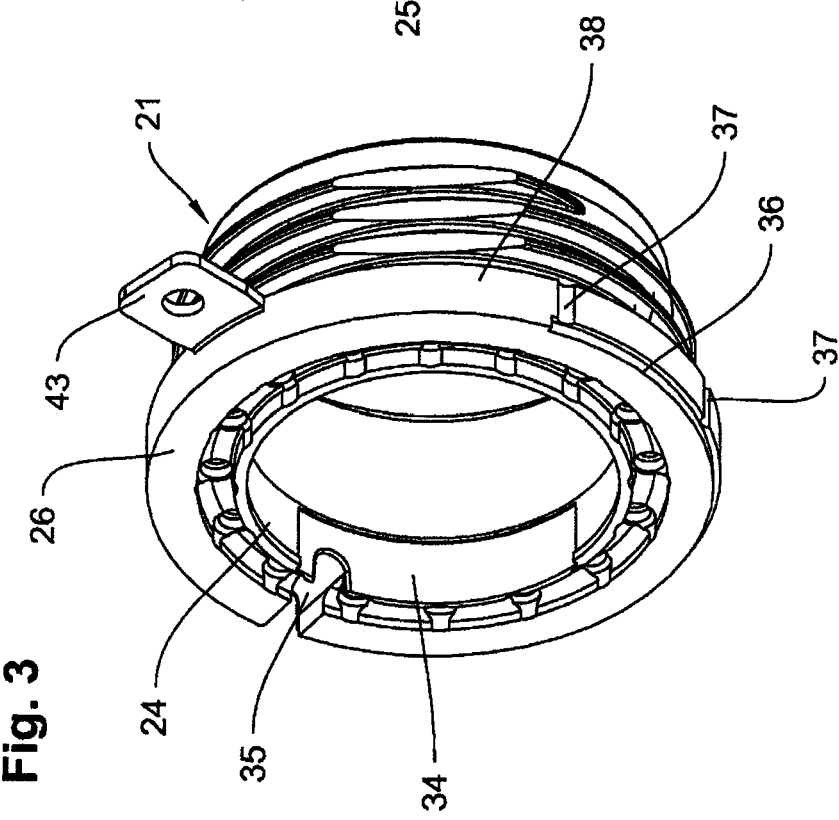

TAPPING ARMATURE FOR A TRANSPORT AND STORAGE CONTAINER FOR LIQUIDS

CROSS-REFERENCE TO RELATED APPLICATION

This application claims priority to German Patent Application 10 2009 016 451.0, filed Apr. 4, 2009, which is fully incorporated by reference herein.

STATEMENT CONCERNING FEDERALLY SPONSORED RESEARCH OR DEVELOPMENT

Not Applicable.

FIELD OF THE INVENTION

The invention relates to a tapping armature having an armature housing device made from plastic, particularly a flap valve or butterfly valve, for transport and storage containers for liquids, which are equipped with a plastic inner container having a closable filling port and a drain port for connection of the tapping armature, an outer casing made from metal mesh or sheet metal, and a pallet-like base made from metal or a plastic material that is at least partially electrically conductive for supporting the inner container. The invention further relates to a method for producing the connection flange for attaching the tapping armature to the drain port of the inner container of the transport and storage container.

BACKGROUND OF THE INVENTION

German Patent No. DE 198 15 082 A1 describes a transport and storage container for liquids in which an grounding element is arranged in the species-related tapping armature attached to the drain port of the inner container, and which is constructed as a curved metal sheet or small plate, extending over a portion of the inner hole of the tapping armature and connected to the base of the container via a fixing screw and an grounding lead.

This tapping armature has the following disadvantages:

The fixing screw that is screwed through the housing wall to attach the sheet or small plate, which is made of metal, in the armature housing, which is made from plastic, does not ensure that the armature is leak-proof. In transport and storage containers for certain liquid foods, the use of metal parts is not permitted, and consequently containers equipped with this armature cannot be used for such liquid foods. Finally, there is a risk with the known liquid containers that when aggressive liquids are transported or stored, the grounding element may be damaged by the liquid to such an extent that electrical grounding is no longer assured.

Certain tapping armatures for liquid containers are known having a housing that is equipped with antistatic means, but these are too expensive to be produced for a mass market.

SUMMARY OF THE INVENTION

The underlying object of the invention is to improve the species-related tapping armature for liquid transport and storage containers so as to provide safe, complete grounding for dissipating electrical charges that are created by liquid friction when the container is filled with or drained of liquids, and to suggest an inexpensive method for production of such.

This object is solved in one embodiment of the invention having an armature housing made from plastic for liquid transport and storage containers, which are equipped with a plastic inner container having a filling port and a drain port for connection of the tapping armature, an outer casing made from metal mesh or sheet metal, and a pallet-like base made from metal. The tapping armature with the filling port of the armature housing is screwed to a connecting flange designed as a threaded flange and made from an electrically non-conductive plastic material, which is welded to the drain port of the inner container. The connecting flange of the armature housing is connected to the base of the outer casing of the transport and storage container via an grounding lead made from an electrically conductive plastic material. Preferably, the connecting flange and the grounding lead are produced in two production steps with an injection molding machine according to 2K technology.

In a further embodiment of the invention, the connecting flange and the grounding cable are injection molded as a single part from an electrically conductive plastic, and the grounding cable is connected to the flange ring of the connecting flange by a tear-off film.

The tapping armatures according to the invention, the housing of which is equipped with a plastic connection flange for welding the housing to the drain port of the plastic inner container of a liquid transport and storage container having an outer casing made from metal mesh or sheet steel and having a pallet-like base made from electrically conductive plastic, enable safe electrical grounding of the liquid that flows out of the inner container when it is emptied, via an electrical grounding lead. In a first embodiment of the tapping armature, a portion of the inner wall of the connecting flange made from non-conductive material connects to the pallet-like base or the outer casing via an electrically conductive ring segment. In a second embodiment of the tapping armature, the connecting flange made from electrically conductive plastic connects to the base or the outer casing. Advantageously, these embodiments are both significantly less expensive than the tapping armatures according to the prior art, in which the entire plastic housing is equipped to combat static buildup.

The foregoing and other objects and advantages of the invention will appear from the following detailed description. In the description, reference is made to the accompanying drawings which illustrate a preferred embodiment of the invention.

BRIEF DESCRIPTION OF THE DRAWINGS

The invention will be explained in the following detailed description with reference to the figures of the drawings, in which:

FIG. 3 is a perspective, enlarged view of a connecting flange of the tapping armature in the first stage produced by injection molding according to 2K technology, FIG. 4 is a perspective, enlarged view of a connecting flange of the tapping armature produced with an grounding lead in the second stage by injection molding according to 2K technology;

DETAILED DESCRIPTION OF THE PREFERRED EMBODIMENT

Figure 1:
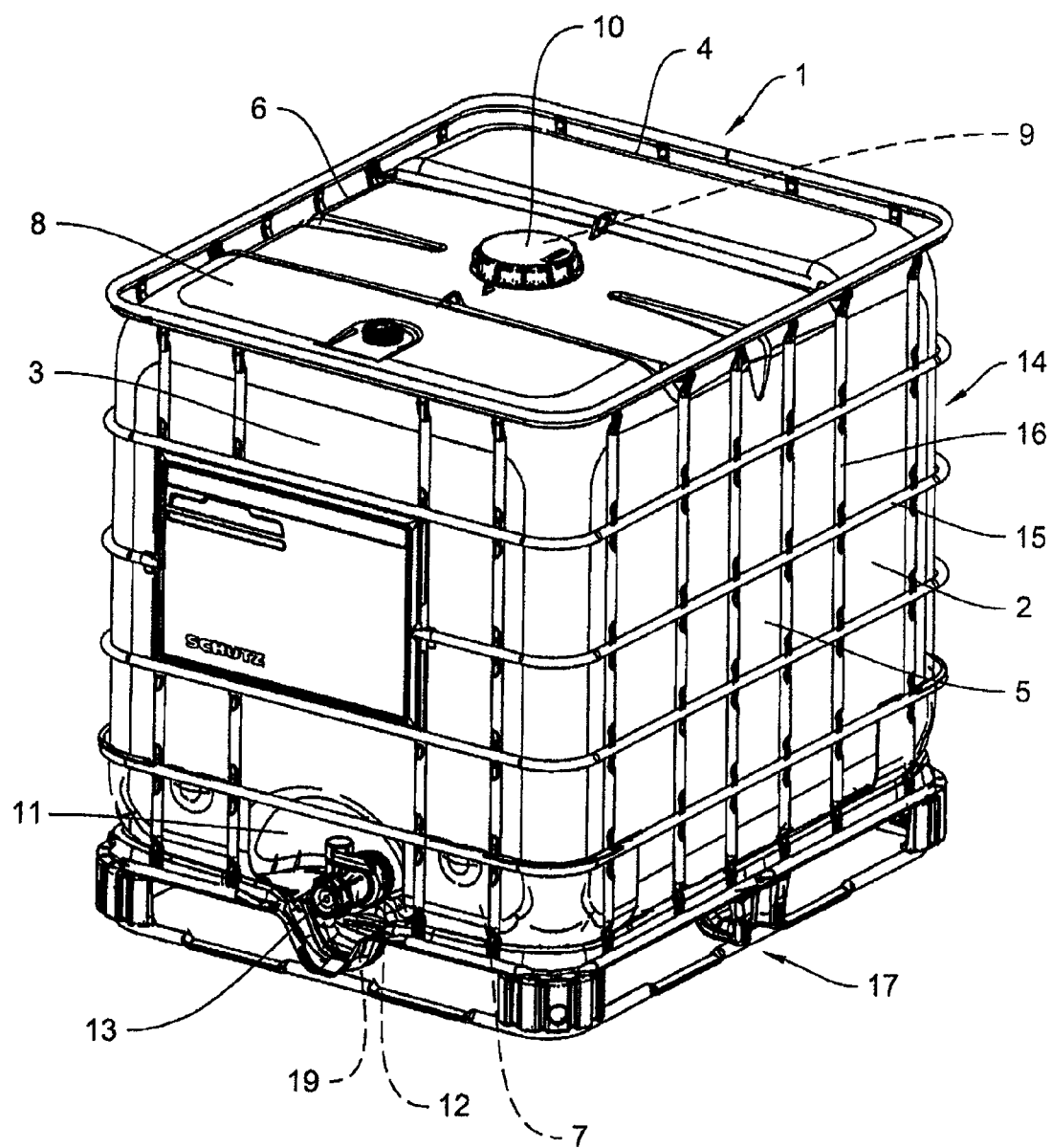
FIG. 1 is a perspective view of a transport and storage container for liquids.

The single use and reusable liquid transport and storage container 1 shown in FIG. 1 has as the main components thereof a replaceable, cuboid inner container 2 made from plastic and having a front face 3, a rear wall 4, and two side walls 5,6, a base 7 designed as a drainage base, and an upper base 8, a filling port 9 conformed thereon and closable with a cap 10, and a tapping port 12 conformed on a concavity 11 in the lower section of front face 3 of the inner container, the drain port being produced integrally with inner container 2 by blow molding, for attachment of a tapping armature 13, particularly a ball or flap valve, also an outer casing 14 in the form of a mesh casing with intersecting horizontal and vertical wire bars 15,16 for supporting inner container 2, and a pallet-like base 17 with, in one embodiment, European standard length and width dimensions for supporting inner container 2.

Figure 2:
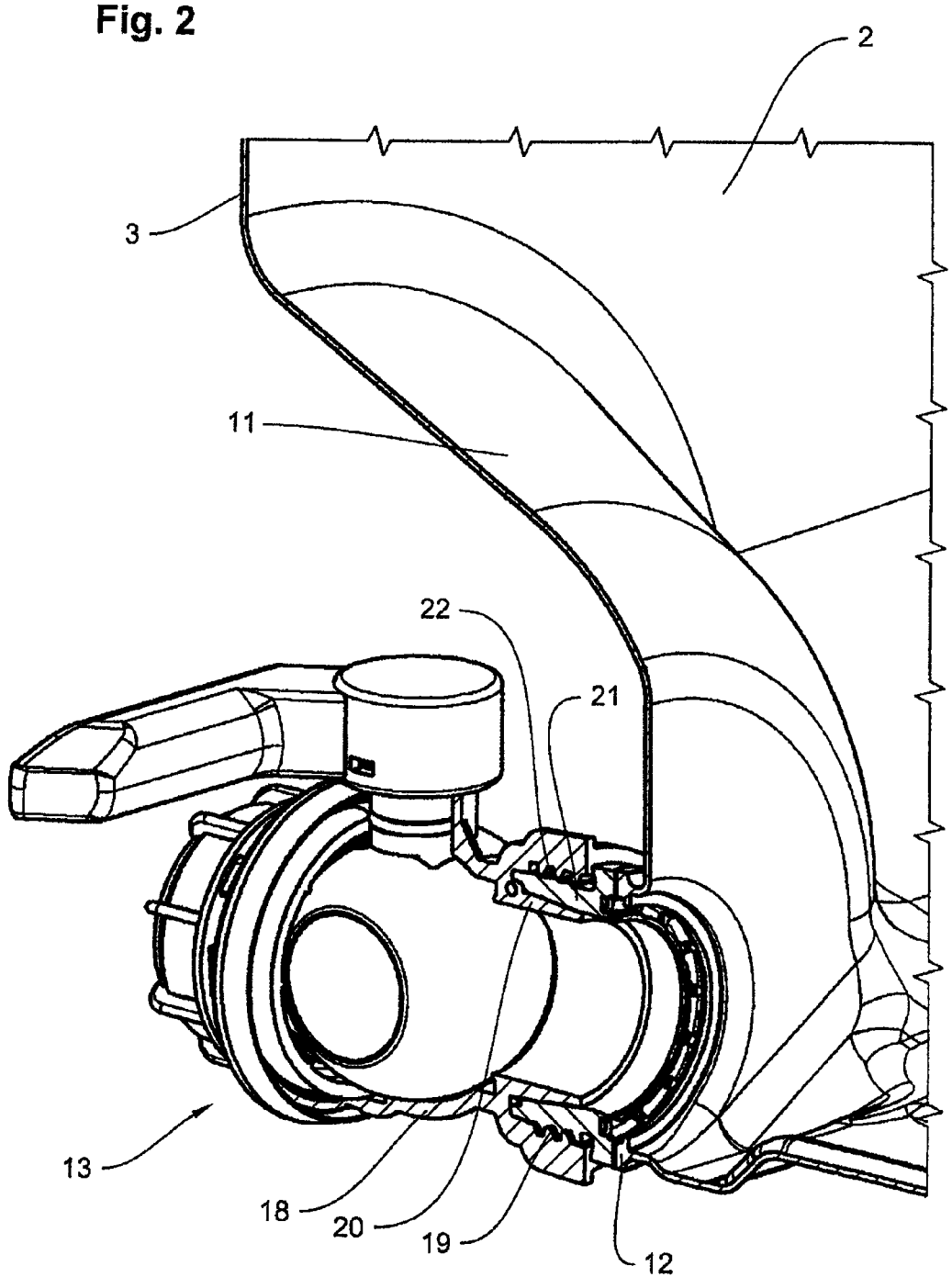
FIG. 2 is a perspective, enlarged and partial cutaway view of the connecting flange that is welded to the drain port of the inner container of the transport and storage container.

Armature housing 18 of armature 13 is injection molded from a high-density polyethylene (PE-HD) and is screwed with filling port 20 having an internal thread 19 onto a connecting flange 21 having a corresponding external thread 22, and sealed off therefrom, and connecting flange 21 is attached together with the screwed on tapping armature 13 to drain port 12 of inner container 2, preferably by mirror-imaged welding. Connecting flange 21 is manufactured as an injection molded part from a non-conducting plastic, for example polyethylene (FIG. 2).

Figure 5:
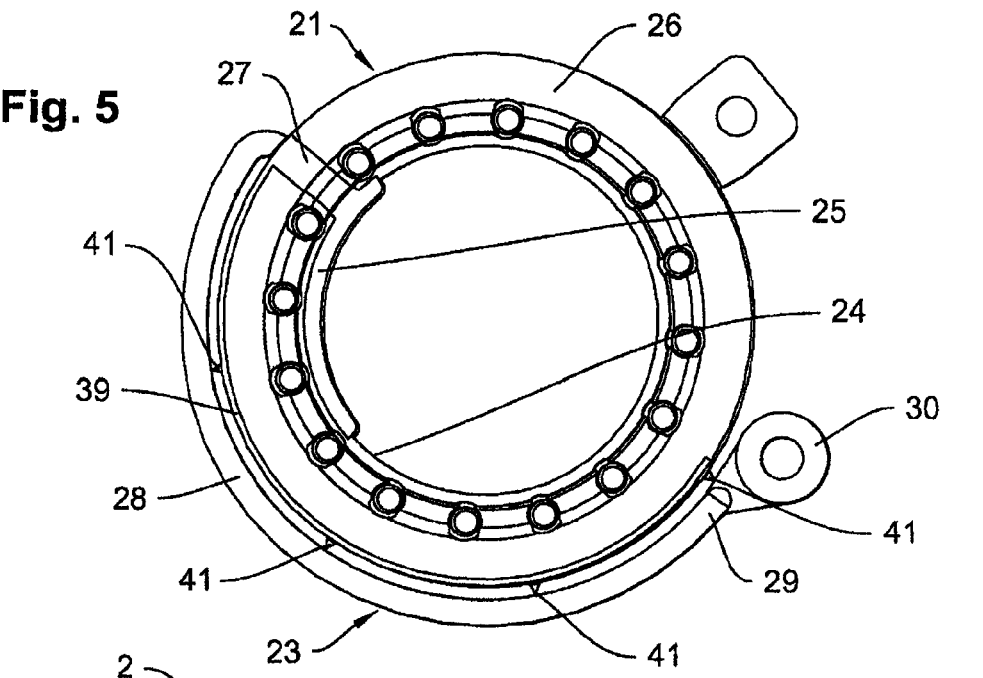
FIG. 5 is a front face view of the connecting flange of the tapping armature from FIG. 4.

Tapping armature 13 is equipped with an electrical grounding element, represented in FIGS. 3 to 5 by an grounding lead 23 constructed as a single part from an electrically conductive plastic, for example polyethylene with nanoparticles, which has a ring segment 25 integrated in inner wall 24 of connecting flange 21, a connecting bridge 27 recessed into flange ring 26 of the connecting flange, and a flexible cable 28 for electrically connecting the connecting flange 21 of armature housing 18 to base 17 or outer casing 14 of transport and storage container 1.

Figure 6:
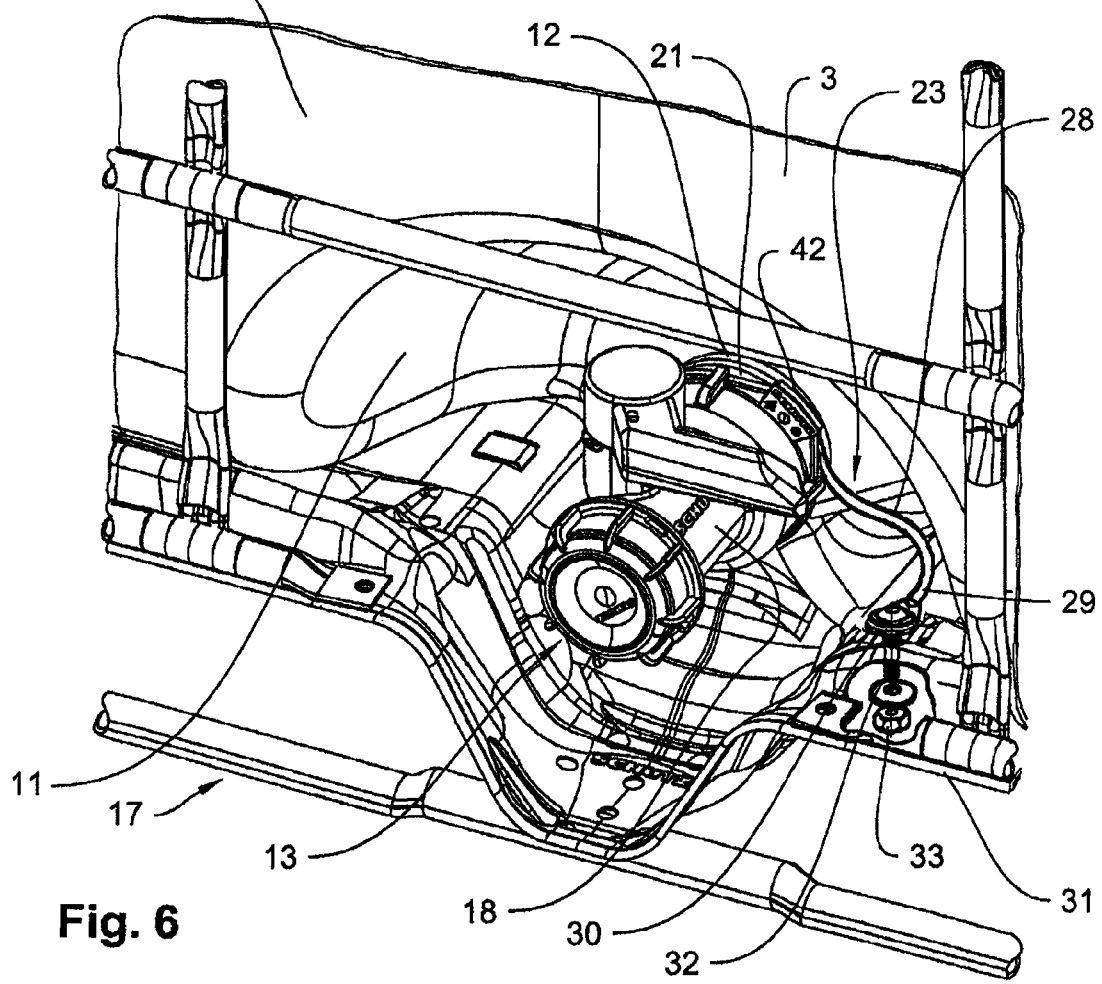
FIG. 6 is a perspective, enlarged view of the drain area of the transport and storage container with the tapping armature.

According to FIG. 6, grounding lead 23 of connecting flange 21 of armature housing 18 is screwed securely to sheet metal base 31 in base 17 of transport and storage container 1 via a lug 30 conformed on free end 29 of cable 28 with a screw 32 and a nut 33.

Preferably, connecting flange 21 shown in FIGS. 3 to 5 and grounding lead 23 conformed integrally therewith are both produced with an injection molding machine according to 2K technology. In a first method step, connecting flange 21 is injection molded from an electrically non-conductive plastic, for example high-density polyethylene (PE-HD), with a recess 34 in inner wall 24 thereof for ring segment 25 of grounding lead 23, a groove 35 in flange ring 26 of connecting flange 21 for connecting bridge 27 of grounding lead 23, and a recess 36 in the form of a ring segment, and grooves 37 adjoining this in outer rim 38 of flange ring 26 for a retaining ring 39 with retaining ribs 40 and tear off tips 41 for cable 28 of grounding lead 23 (FIG. 3). Then, in a second method step with the same injection molding machine, an electrically conductive plastic, for example polyethylene with nanoparticles is molded on the prefabricated connecting flange 21 to produce the grounding lead with ring segment 25, connecting bridge 27, and cable 28 (FIGS. 4 and 5). After connecting flange 21 with armature housing 18 screwed thereto has been welded onto drain port 12 of inner container 2 of transport and storage container 1, flexible cable 28 of grounding lead 23 is detached by tear-off tips 41 of retaining ribs 40 of retaining ring 39 on the outer rim 38 of flange ring 26 of connecting flange 21.

The ring segment 25 that is integrated in inner wall 24 of connecting flange 21, and the fixing lug 30 on free end 29 of cable 28 of grounding lead 23 are overmolded during the injection molding process and then peeled off to improve their electrical conductivity.

Armature housing 18 and connecting flange 21 are connected to each other via a tamper-resistant seal formed by a circlip 42, which connects a lug 43 that is injection molded on flange ring 26 of connecting flange 21 to a corresponding lug (not shown) on armature housing 18 (FIGS. 3 and 6).

Figure 7:
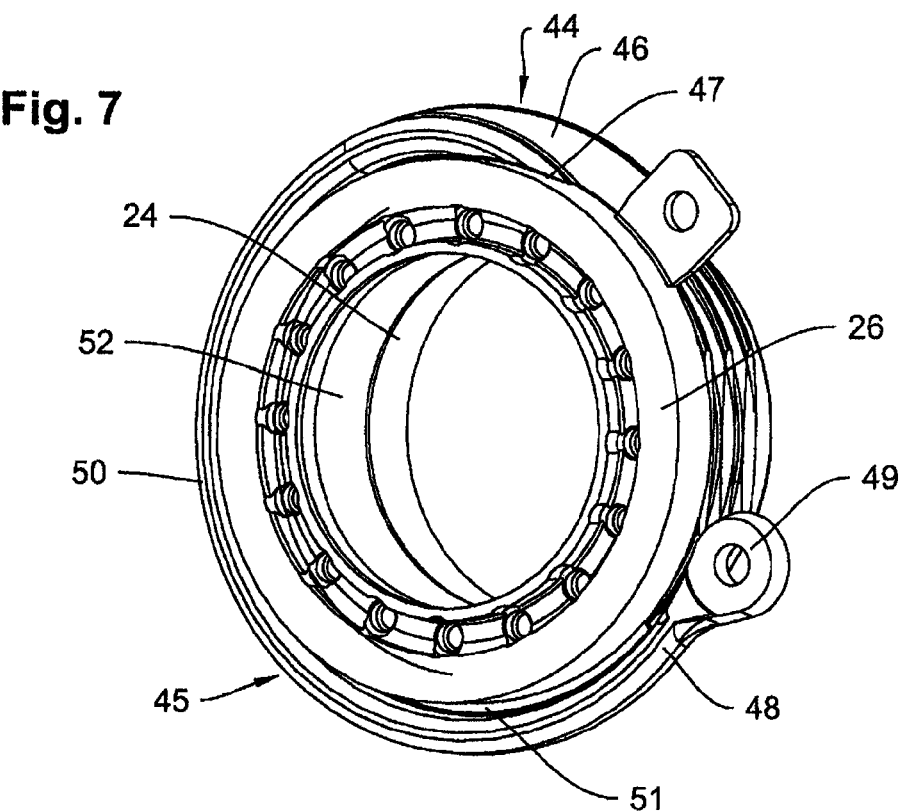
FIG. 7 is a perspective view of a connecting flange that is injection molded from an electrically conductive plastic material as a single part with an grounding lead.
Figure 8:
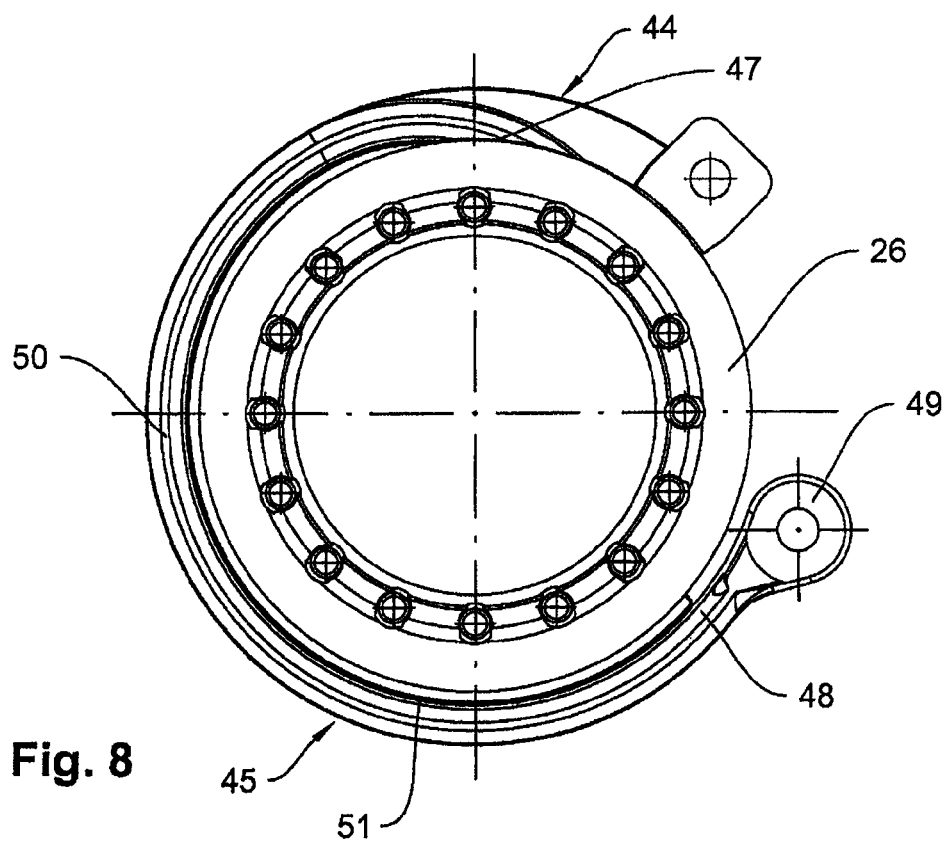
FIG. 8 is a front face of the connecting flange of FIG. 7.

A further connecting flange 44, which is shown in FIGS. 7 and 8 as a threaded flange, to which armature housing 18 is screwed with filling port 20 as shown in FIG. 2, and with which armature housing 18 is welded to drain port 12 of inner container 2, is injection molded from an electrically conductive plastic, for example a high-density polyethylene (PE-HD) with nanoparticles, as a single part with a semi-rigid grounding lead 45.

One end 46 of grounding cable 45 is attached via a bridge 47 to flange ring 26 of connecting flange 44, and the other end 48 of grounding cable 45 has a fixing lug 49 for attaching to the base 17 our outer casing 14 of transport and storage container 1.

Cable section 50 between bridge 47 and fixing lug 49 is connected to flange ring 26 of connecting flange 44 by a tear-off film 51 in such manner that, after connecting flange 44 with tapping armature 13 has been welded to drain port 12 of inner container 2, the cable section 50 of grounding cable 45 between bridge 47 and fixing lug 49 on base 17 or outer casing 14 of transport and storage container 1 may be detached from flange ring 26 of connecting flange 44.

A cylindrical section 52 of inner wall 24 of connecting flange 21 is peeled off to improve the electrical conductivity of the connecting flange.

While there has been shown and described what are at present considered the preferred embodiments of the invention, it will be obvious to those skilled in the art that various changes and modifications can be made therein without departing from the scope of the invention defined by the appended claims

The invention claimed is:

1. A tapping armature for a liquid transport and storage containers equipped with a plastic inner container having a closable filling port and a drain port for connection of the tapping armature, an outer casing made from metal mesh or sheet metal, and a pallet-like base made from metal or a plastic material that is at least partially electrically conductive for supporting the inner container, said tapping armature comprising:
    an armature housing made from plastic;
    a connecting flange made from non-conductive plastic, to which the armature housing with the filling port is screwed, and with which the armature housing is welded to the drain port of the inner container;
    an electrical grounding element of the tapping armature having at least one ring segment integrated in the inner wall of the connecting flange by an integrally constructed grounding lead made from an electrically conductive plastic;
    a connecting bridge recessed into the flange ring of the connecting flange of the armature housing; and a flexible cable for electrically connecting the connecting flange of the armature housing to at least one of the base and the outer casing of the transport and storage container.

2. The tapping armature as recited in claim 1, including a lug conformed on the free end of the cable of the grounding lead of the connecting flange of the armature housing for securing the grounding lead to the base or the outer casing of the transport and storage container.

3. The tapping armature as recited in claim 1, in which the grounding lead of the connecting flange is made from a high-density polyethylene (PE-HD) with nanoparticles.

4. A method for manufacturing the connecting flange and the grounding lead for the armature housing of the tapping armature as recited in claim 1, using 2K technology with an injection molding machine, said method comprising:
- injection molding a connecting flange from an electrically non-conductive plastic, with at least one recess in the inner wall thereof for ring segment of grounding lead, a groove in flange ring of connecting flange for connecting bridge of grounding lead, and a recess in the form of a ring segment, and axial grooves adjoining this in outer rim of flange ring of the connecting flange for a retaining ring with retaining ribs and tear off tips for cable of grounding lead; and
- molding with the same injection molding machine, an electrically conductive plastic on the prefabricated connecting flange to produce the grounding lead with ring segment, connecting bridge, and cable.

5. The method as recited in claim 4, in which ring segments integrated in the inner wall of the connecting flange and the fixing lug on the free end of the cable of the grounding lead of the connecting flange of the tapping armature are overmolded and then peeled off to improve electrical conductivity.

6. A tapping armature for liquid transport and storage containers, which are equipped with a plastic inner container having a closable filling port and a drain port for connection of the tapping armature, a closable filling port and a drain port for connection of the tapping armature, an outer casing made from metal mesh or sheet metal, and a pallet-like base made from metal or a plastic material that is at least partially electrically conductive for supporting the inner container, said tapping armature comprising:
- an armature housing made from plastic;
- a connecting flange constructed as a threaded flange made from an electrically conductive plastic material, to which the armature housing is screwed with the filling port, and with which the armature housing is welded to the drain port of inner container; and
- a flexible electrical grounding lead constructed integrally with the connecting flange by injection molding, one end of which grounding lead is connected to the flange ring of the connecting flange via a bridge, and the other end of which has a fixing lug for attaching to the base or outer casing of the transport and storage container, wherein the cable section between the bridge and the fixing lug is connected to the flange ring of the connecting flange by a tear-off film in such manner that after the connecting flange with tapping armature has been welded to drain port of inner container, the cable section of grounding cable between bridge and fixing lug on base or outer casing of transport and storage container may be detached from flange ring of connecting flange.

* * * * *